US009896575B2

(12) United States Patent
Duchesne et al.

(10) Patent No.: US 9,896,575 B2
(45) Date of Patent: *Feb. 20, 2018

(54) MELT-PROCESSABLE COMPOSITIONS HAVING SILICONE-CONTAINING POLYMERIC PROCESS ADDITIVE AND SYNERGIST

(71) Applicant: 3M INNOVATIVE PROPERTIES COMPANY, St. Paul, MN (US)

(72) Inventors: Denis Duchesne, Woodbury, MN (US); Maria P. Dillon, Minneapolis, MN (US); Claude Lavallee, Maplewood, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/407,393

(22) PCT Filed: May 23, 2013

(86) PCT No.: PCT/US2013/042485
§ 371 (c)(1),
(2) Date: Dec. 11, 2014

(87) PCT Pub. No.: WO2013/188076
PCT Pub. Date: Dec. 19, 2013

(65) Prior Publication Data
US 2015/0175786 A1 Jun. 25, 2015

Related U.S. Application Data

(60) Provisional application No. 61/658,187, filed on Jun. 11, 2012.

(51) Int. Cl.
| | | |
|---|---|---|
| *C08L 23/06* | (2006.01) | |
| *C08K 5/544* | (2006.01) | |
| *C08L 83/10* | (2006.01) | |
| *C08K 5/09* | (2006.01) | |
| *C08K 5/10* | (2006.01) | |
| *C08K 5/32* | (2006.01) | |
| *C08G 77/455* | (2006.01) | |
| *C08K 5/3435* | (2006.01) | |

(52) U.S. Cl.
CPC ............ *C08L 23/06* (2013.01); *C08G 77/455* (2013.01); *C08L 83/10* (2013.01); *C08K 5/09* (2013.01); *C08K 5/10* (2013.01); *C08K 5/32* (2013.01); *C08K 5/3435* (2013.01); *C08L 2201/08* (2013.01); *C08L 2205/03* (2013.01); *C08L 2205/06* (2013.01); *C08L 2207/066* (2013.01)

(58) Field of Classification Search
CPC ......... C08L 23/00; C08L 83/08; C08K 5/544; C08K 5/5445
See application file for complete search history.

(56) References Cited

U.S. PATENT DOCUMENTS

| | | | |
|---|---|---|---|
| 3,125,547 A | 3/1964 | Blatz | |
| 4,107,258 A | 8/1978 | Angell, Jr. | |
| 4,535,113 A | 8/1985 | Foster | |
| 4,695,602 A | 9/1987 | Crosby | |
| 4,837,275 A | 6/1989 | Chu | |
| 4,855,360 A | 8/1989 | Duchesne | |
| 4,857,593 A | 8/1989 | Leung | |
| 4,900,474 A | 2/1990 | Terae | |
| 4,925,890 A | 5/1990 | Leung | |
| 5,028,679 A | 7/1991 | Terae | |
| 5,118,775 A | 6/1992 | Inomata | |
| 5,227,448 A | 7/1993 | Durfee | |
| 5,236,997 A | 8/1993 | Fujiki | |
| 5,324,805 A * | 6/1994 | Kioka ................... | C08F 210/16 524/147 |
| 5,356,585 A | 10/1994 | Romenesko | |
| 5,403,891 A | 4/1995 | Romenesko | |
| 5,635,128 A | 6/1997 | Gardiner | |
| 5,665,803 A | 9/1997 | Nohr | |
| 5,708,085 A | 1/1998 | Hauenstein | |
| 5,744,548 A | 4/1998 | Nohr | |
| 5,789,473 A | 8/1998 | Hauenstein | |
| 6,013,217 A | 1/2000 | Hauenstein | |
| 6,087,015 A | 7/2000 | Cretekos | |
| 6,235,863 B1 | 5/2001 | Hoxmeier | |
| 6,455,150 B1 | 9/2002 | Sheppard | |
| 6,846,893 B1 | 1/2005 | Sherman | |
| 7,105,233 B2 | 9/2006 | Bechthold | |
| 7,250,127 B2 | 7/2007 | Geck | |
| 7,253,232 B2 | 8/2007 | Pfaendner | |
| 7,316,843 B2 * | 1/2008 | Mooney .................... | D01F 6/90 264/211.1 |

(Continued)

FOREIGN PATENT DOCUMENTS

| | | | |
|---|---|---|---|
| CN | 1526756 A * | 9/2004 | |
| EP | 0703938 | 4/1996 | |

(Continued)

OTHER PUBLICATIONS

Machine translated English language equivalent of CN 1526756 (2004, 7 pages).*
Dow, "MB50-001 Masterbatch", 2001, 6pgs.
Dow, "MB50-002 Masterbatch", 2001, 4pgs.
Wacker, "Silicon Based Plastic Additives", Genioplast, 12pgs.
Yilgor, "Surface properties of plolyamides modified with reactive polydimethylsiloxane oligomers and copolymers", Polymer, 2003, vol. 44, pp. 7271-7279.
International Search Report for PCT International Application No. PCT/US2013/042485, dated Aug. 23, 2013, 4pgs.

*Primary Examiner* — Brieann R Johnston
(74) *Attorney, Agent, or Firm* — Thomas M. Spielbauer

(57) ABSTRACT

Melt-processable compositions having silicone-containing polymeric process additives and synergists.

14 Claims, No Drawings

(56) References Cited

U.S. PATENT DOCUMENTS

| | | |
|---|---|---|
| 7,705,101 B2 | 4/2010 | Sherman |
| 8,546,507 B2 * | 10/2013 | Lavallee .............. C08G 69/42 528/26 |
| 2004/0209070 A1 | 10/2004 | Sheppard |
| 2007/0167575 A1 | 7/2007 | Weaver |
| 2007/0213431 A1 * | 9/2007 | Adur .............. C08F 255/00 524/63 |
| 2007/0232772 A1 | 10/2007 | Ziche |
| 2008/0058449 A1 | 3/2008 | Tonge |
| 2008/0318057 A1 | 12/2008 | Sherman |
| 2008/0318065 A1 | 12/2008 | Sherman |
| 2010/0119751 A1 | 5/2010 | Lanier |
| 2011/0143623 A1 * | 6/2011 | Abed .............. B32B 5/022 442/329 |
| 2011/0262672 A1 | 10/2011 | Lavallee |

FOREIGN PATENT DOCUMENTS

| | | | | |
|---|---|---|---|---|
| EP | 1820642 | 8/2007 | | |
| EP | 1842876 | 10/2007 | | |
| EP | 1862496 | 12/2007 | | |
| EP | 1862501 | 12/2007 | | |
| EP | 2 070 972 A1 | 6/2009 | | |
| GB | 1460128 | 12/1976 | | |
| JP | H06-055698 | 3/1994 | | |
| JP | H06-065447 | 3/1994 | | |
| JP | H07-118461 | 5/1995 | | |
| WO | WO 1994-18267 | 8/1994 | | |
| WO | WO 2002-42371 | 5/2002 | | |
| WO | WO 2003-066512 | 8/2003 | | |
| WO | WO 2006-069639 | 7/2006 | | |
| WO | WO 2007-080338 | 7/2007 | | |
| WO | WO 2010-077480 | 7/2010 | | |
| WO | WO 2010077477 A1 * | 7/2010 | ............. | C08G 69/42 |
| WO | WO 2011/025052 A1 | 3/2011 | | |

* cited by examiner

MELT-PROCESSABLE COMPOSITIONS HAVING SILICONE-CONTAINING POLYMERIC PROCESS ADDITIVE AND SYNERGIST

TECHNICAL FIELD

Melt-processable compositions and articles made using melt-processable compositions.

BACKGROUND

Siloxanes are known to be effective polymer processing additives (PPAs). Low molecular weight polydimethyl silicone (PDMS) PPAs were reported as early as 1985 (see U.S. Pat. No. 4,535,113). Further, high molecular weight siloxane PPAs have more recently become available, for instance, from Dow Corning. The efficacy of these materials, however, is generally inferior to fluoroelastomer PPAs such as FX-9613 (available from 3M Company). Further, the tacky nature of such siloxane PPAs can make them difficult to handle and as such they are only provided as concentrates.

Siloxane block copolymers have also demonstrated efficacy as PPAs. For instance, 3M has developed a siloxane-polyamide PPA, and siloxane-polyurea block copolymers (SPU) are available from Wacker. These materials are thermoplastic and generally are more easily handled. Although effective as PPAs, they are typically less efficacious than fluoroelastomer based PPAs.

In practice, PPAs are added to melt-processable thermoplastic hydrocarbon polymers in order to improve their characteristics, for instance, in blow molding or injection molding. Such molded products often contain hindered amine light stabilizers.

SUMMARY

In one aspect, the present application relates to a composition comprising from 50 to 99.99 weight percent based on the total weight of the composition of a melt-processable thermoplastic hydrocarbon polymer. The composition further comprises a silicone-containing polymeric process additive and a synergist. Furthermore, the synergist is present in an amount of from 10 wt % to 70 wt % based on the total amount of synergist and process additive.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

DETAILED DESCRIPTION

Petroleum-based resources are used both as raw materials as well as to produce the energy to convert such raw materials into finished goods for consumer and industrial use. The finiteness of these petro-resources persists as a central issue of our time. As such, there is a continued need to improve the efficiency of use of such petro-resources. This includes the reduction of the energy required in industrial processes generally, as well as the reduction of material scrap from such resources. In this regard, there is a continued need to improve the performance of PPAs in melt-processable thermoplastic hydrocarbon polymers, to give (a) lower energetic operating conditions, and/or (b) to improve processes so that more of the finished articles are free from defects. In this regard, the applicants provide herein compositions that comprise a major amount (e.g., from 50 to 99.5 weight percent based on the total weight of the composition) of a melt-processable thermoplastic hydrocarbon polymer; a silicone-containing polymeric process additive; and a synergist. The synergist is present in an amount of from 10 wt % to 70 wt % based on the total amount of synergist and process additive.

Definitions

The term "aralkyl" refers to a monovalent group of formula —$R^a$—Ar where $R^a$ is an alkylene and Ar is an aryl group. That is, the aralkyl is an alkyl substituted with an aryl.

The term "alkaryl" refers to a monovalent group of the formula —Ar—$R^a$ where $R^a$ is an alkylene and Ar is an aryl group. That is, the alkaryl is an aryl substituted with one or more alkyl.

The term "aralkylene" refers to a divalent group of formula —$R^a$—$Ar^a$— where $R^a$ is an alkylene and $Ar^a$ is an arylene (i.e., an alkylene is bonded to an arylene).

The term "alkarylene" refers to a divalent group of formula —$Ar^a$-$R^a$— where $R^a$ is an alkylene and $Ar^a$ is an arylene (i.e., an arylene is bonded to an alkylene).

The term "polydiorganosiloxane" refers to a divalent segment of formula

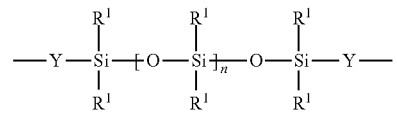

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 0 to 1500.

Hydrocarbon Polymer

Hydrocarbon polymers described herein may generally be thermoplastic materials, or materials that flow when heated sufficiently above their glass transition point and become solid when cooled. They may also have elastomeric properties. The hydrocarbon polymer includes but is not limited to hot melt processable thermoplastic polymers (which may be elastomeric or non-elastomeric), such as polypropylene, polystyrene, polyethylene, and polyesters, or mixtures thereof, excluding thermoplastic silicone-containing PPA's as described herein (e.g., those of Formulas I, and II). By "hot melt processable" it is meant that the polymer will melt and flow at a temperature at which the thermoplastic silicone-containing PPA's of Formulas I, and II) will melt and flow.

The hydrocarbon polymer may be solvent or melt mixed with the thermoplastic silicone-containing PPA component(s). The hydrocarbon polymer may comprise other additives, fillers, and the like, however, such additives are not a thermoplastic silicone-containing PPA compound of Formulas I, and II.

At use temperature the mixtures generally have at least two domains, one discontinuous and the other continuous, because of the general immiscibility of the thermoplastic silicone-containing PPA component with the hydrocarbon polymer. Of course, the mixture may contain more than one thermoplastic silicone-containing PPA component and more than one hydrocarbon polymer.

In some embodiments, the melt-processable thermoplastic hydrocarbon polymer described herein is selected from the group consisting of: a polyethylene homopolymer, a polypropylene homopolymer, a modified polyethylene polymer, a modified polypropylene polymer, a polyethylene copolymer, a polypropylene copolymer, and a combination thereof. The melt-processable thermoplastic hydrocarbon polymer may be of a high density type or low density type.

In particular, thermoplastic materials useful in the present disclosure that are generally considered non-elastomeric include, for example, polyolefins such as polypropylene, low density polyethylene, linear low density polyethylene, very low density polyethylene, medium density polyethylene, high density polyethylene, such as that available under the trade designation DOW HDPE DMDA-8904 NT7 commercially available from DOW Plastics an affiliate of the DOW Chemical Co., Michigan USA, polybutylene, non-elastomeric polyolefin copolymers or terpolymers, such as ethylene/propylene copolymer and blends thereof; ethylene-vinyl acetate copolymers such as that available under the trade designation ELVAX 260, available from DuPont Chemical Co.; ethylene acrylic acid copolymers; ethylene methacrylic acid copolymers such as that available under the trade designation SURLYN 1702, available from DuPont Chemical Co.; polymethylmethacrylate; polystyrene; ethylene vinyl alcohol; polyester; amorphous polyester; polyamides; fluorinated thermoplastics, such a polyvinylidene fluoride, fluorinated ethylene/propylene copolymers and fluorinated ethylene/propylene copolymers; halogenated thermoplastics, such as a chlorinated polyethylene and polyvinyl chloride (PVC). Any single hydrocarbon material can be mixed with at least one silicone-based PPA-containing component. Alternatively, a mixture of hydrocarbon polymer may be used.

The hydrocarbon polymer may be present in the compositions described herein in a major amount. That is, the hydrocarbon polymer may be present in an amount of from 50 to 99.5 percent by weight based on the total weight of the composition. More specifically, the hydrocarbon polymer may be present in a weight percent of from 99.99 wt % to 95 wt % based on the total weight of the composition.

Silicone-Polyamide Polymeric Process Additive

Various silicone-containing PPAs are useful in the compositions presently disclosed. Such silicone-containing PPAs may be thermoplastic. Silicone-containing PPAs may be polydiorganosiloxane polyamide polymers, or may include silicone-polyurethane polymers.

Thermoplastic silicone-containing polymer process additive components useful in the present disclosure may have a molecular weight greater than 25,000 g/mol, greater than 50,000 g/mol, and even greater than 100,000 g/mol. These silicone-containing PPA's include linear, polydiorganosiloxane polyamide block copolymers, polydiorganosiloxane urethane-containing copolymers, and the like. Silicone-containing PPA's presently disclosed are substantially free of fluoropolymers, siloxanes and any other process additives that are not "hot melt processable" per se (by not "hot melt processable" in this context, it is meant that such materials are fluidic polymers with very low glass transition (Tg) values, and flow at room temperature and above without the need for elevated temperatures).

A linear, polydiorganosiloxane polyamide block copolymer useful in compositions of the present disclosure contains at least two repeat units of Formula I:

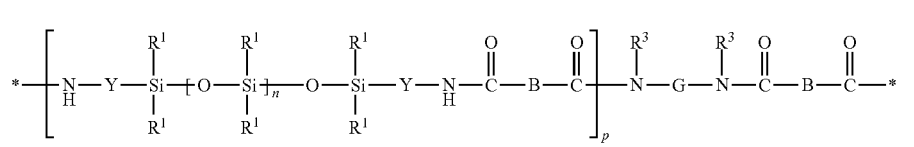

In this formula (I), each R' is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500 and subscript p is an integer of 1 to 10. Each group B is independently a covalent bond, an alkylene of 4-20 carbons, an aralkylene, an arylene, or a combination thereof. When each group B is a covalent bond, the polydiorganosiloxane polyamide block copolymer of Formula I is referred to as a polydiorganosiloxane polyoxamide block copolymer.

Group G is a divalent group that is the residue unit that is equal to a diamine of formula $R^3HN$-G-$NHR^3$ minus the two —$NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine or the like). Each asterisk (*) indicates a site of attachment of the repeat unit to another group in the copolymer such as, for example, another repeat unit of Formula I.

Suitable alkyl groups for $R^1$ in Formula I typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for R' often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (i.e., it may be an alkaryl group) (the alkyl group may be, e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some embodiments, in some repeat units of Formula I, at least 40 percent, and preferably at least 50 percent, of the $R^1$ groups are phenyl, methyl, or combinations thereof. For example, at least 60 percent, at least 70 percent, at least 80 percent, at least 90 percent, at least 95 percent, at least 98 percent, or at least 99 percent of the $R^1$ groups can be phenyl, methyl, or combinations thereof. In some embodiments, in some repeat units of Formula I, at least 40 percent, and preferably at least 50 percent, of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula I is independently an alkylene, aralkylene, alkarylene or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula I is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula I is a residual unit that is equal to a diamine compound of formula $R^3HN-G-NHR^3$ minus the two amino groups (i.e., $-NHR^3$ groups). The diamine can have primary or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN-G-NHR^3$ is piperazine). In most embodiments, $R^3$ is hydrogen or an alkyl. In many embodiments, both of the amino groups of the diamine are primary amino groups (i.e., both $R^3$ groups are hydrogen) and the diamine is of formula $H_2N-G-NH_2$.

In some embodiments, G is an alkylene, heteroalkylene, polydiorganosiloxane, arylene, aralkylene, alkarylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. Some exemplary alkarylene groups are alkylene-phenylene where the alkylene having 1 to 10 carbon atoms, 1 to 8 carbon atoms, 1 to 6 carbon atoms, or 1 to 4 carbon atoms is bonded to an phenylene. As used herein with reference to group G, "a combination thereof" refers to a combination of two or more groups selected from an alkylene, heteroalkylene, polydiorganosiloxane, arylene, aralkylene, and alkarylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

In some embodiments, the polydiorganosiloxane polyamide is a polydiorganosiloxane polyoxamide. The polydiorganosiloxane polyoxamide tends to be free of groups having a formula $-R^a-(CO)-NH-$ where $R^a$ is an alkylene. All of the carbonylamino groups along the backbone of the copolymeric material are part of an oxalylamino group (i.e., the $-(CO)-(CO)-NH-$ group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyamide is a block copolymer and can be an elastomeric material. Unlike many of the known polydiorganosiloxane polyamides that are generally formulated as brittle solids or hard plastics, the polydiorganosiloxane polyamides can be formulated to include greater than 50 weight percent polydiorganosiloxane segments based on the weight of the copolymer. The weight percent of the diorganosiloxane in the polydiorganosiloxane polyamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyamides. Higher amounts of the polydiorganosiloxane can be used to prepare elastomeric materials with lower modulus while maintaining reasonable strength.

Some of the polydiorganosiloxane polyamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to 350° C. Additionally, the copolymers can often be heated at a temperature such as 250° C. for 1 hour in air without apparent degradation as determined by no detectable loss of mechanical strength upon cooling.

Certain embodiments of the copolymeric material of Formula I can be optically clear. As used herein, the term "optically clear" refers to a material that is clear to the human eye. An optically clear copolymeric material often has a luminous transmission of at least 90 percent, a haze of less than 2 percent, and opacity of less than about 1 percent in the 400 to 700 nm wavelength range. Both the luminous transmission and the haze can be determined using, for example, the method of ASTM-D 1003-95.

Additionally, certain embodiments of the copolymeric material of Formula I can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. The copolymeric material usually has a refractive index in the range of 1.41 to 1.60.

The polydiorganosiloxane polyamides are soluble in many common organic solvents such as, for example, toluene, tetrahydrofuran, dichloromethane, aliphatic hydrocarbons (e.g., alkanes such as hexane), or mixtures thereof.

Silicone-containing polymer process additive components useful in the present disclosure may have a molecular weight greater than 25,000 g/mol, greater than 50,000 g/mol, and even greater than 100,000 g/mol. These silicone-containing PPA's include linear, polydiorganosiloxane polyamide block copolymers, polydiorganosiloxane urethane-containing copolymers, and the like. Silicone-containing PPA's presently disclosed are substantially free of fluoropolymers, siloxanes and any other process additives that are not "hot melt processable" per se (by not "hot melt processable" in this context, it is meant that such materials are fluidic polymers with very low glass transition (Tg) values, and flow at room temperature and above without the need for elevated temperatures).

Silicone-polyurethane copolymers (SPU) are not particularly limited, and include, for instance, block copolymers comprising silicone blocks and diamide blocks. At points herein the term silicone-polyurea may be used interchangeable with silicone-polyurethane.

Diamide blocks may have two amide functional groups (—NHCO—) attached to a divalent organic radical (such as alkyl groups, cycloalkyl groups, and aryl groups, containing from 1 to 30 carbon atoms). Non-limiting examples of diisocyanate compounds from which diamide groups may be derived are ethylene diisocyanate, 1,6-hexylene diisocyanate, 1,12-dodecylene diisocyanate, 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenyl diisocyanate, toluene-2,6,-diisocyanate, mixtures of toluene-2,6-diisocyanate and toluene-2,4-diisocyanate, 1,4-cyclohexylene diisocyanate, 4,4'-dicyclohexylmethane diisocyanate, 3,3'-diphenyl-4,4'-biphenylene diisocyanate, 4,4'-biphenylene diisocyanate, 2,4-diisocyanatodiphenylether, 2,4-dimethyl-1,3-phenylene diisocyanate, 4,4'-diphenylether diisocyanate, isophorone diisocyanate, and the like, and mixtures of any of the foregoing.

Silicone blocks include those having the general formula (Si(R²)₂O—) wherein R² is an organic group selected from the group consisting of substituted and unsubstituted alkyl groups, cycloalkyl groups, and aryl groups, each R² group being the same or different as the other connected to a given Si atom and having from 1 to 18 carbon atoms. Non-limiting examples include dimethylsilicones, diethylsilicones, and diphenylsilicones.

Polydiorganosiloxane urethane-containing copolymers (a subset of the class of SPU materials) useful in compositions of the present disclosure contain soft polydiorganosiloxane units, hard polyisocyanate residue units, terminal groups and optionally soft and/or hard organic polyamine residue units. Some polydiorganosiloxane urea-containing copolymers are commercially available under the trade designation "Geniomer 140" available from Wacker Chemie AG, Germany. The polyisocyanate residue is the polyisocyanate minus the —NCO groups, the organic polyamine residue is the organic polyamine minus the —NH groups, and the polyisocyanate residue is connected to the polydiorganosiloxane units or organic polyamine residues by urea linkages. The terminal groups may be non-functional groups or functional groups depending on the purpose of the polydiorganosiloxane urea segmented copolymer.

The polydiorganosiloxane urethane containing copolymers useful in presently disclosed compositions contains at least two repeat units of Formula II

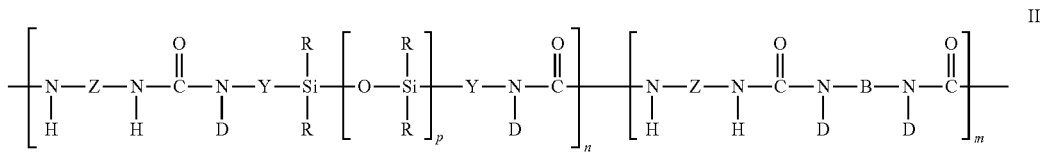

In this Formula II each R is a moiety that independently is an alkyl moiety preferably having about 1 to 12 carbon atoms and may be substituted with, for example, trifluoroalkyl or vinyl groups, a vinyl radical or higher alkenyl radical preferably represented by the formula —R² (CH₂)ₐ CH—CH₂ wherein R² is —(CH₂)_b— or —(CH₂)_c CH— CH— and a is 1, 2 or 3; b is 0, 3 or 6; and c is 3, 4 or 5, a cycloalkyl moiety having about 6 to 12 carbon atoms and may be substituted with alkyl, fluoroalkyl, and vinyl groups, or an aryl moiety preferably having about 6 to 20 carbon atoms and may be substituted with, for example, alkyl, cycloalkyl, fluoroalkyl and vinyl groups or R is a perfluoroalkyl group as described in U.S. Pat. No. 5,028,679, wherein such description is incorporated herein by reference, a fluorine-containing group, as described in U.S. Pat. No. 5,236,997, wherein such description is incorporated herein by reference, or a perfluoroether-containing group, as described in U.S. Pat. Nos. 4,900,474 and 5,118,775, wherein such descriptions are incorporated herein by reference; preferably at least 50% of the R moieties are methyl radicals with the balance being monovalent alkyl or substituted alkyl radicals having 1 to 12 carbon atoms, alkenylene radicals, phenyl radicals, or substituted phenyl radicals; each Z is a polyvalent radical that is an arylene radical or an aralkylene radical preferably having from about 6 to 20 carbon atoms, an alkylene or cycloalkylene radical preferably having from about 6 to 20 carbon atoms, preferably Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof; each Y is a polyvalent radical that independently is an alkylene radical preferably having 1 to 10 carbon atoms, an aralkylene radical or an arylene radical preferably having 6 to 20 carbon atoms; each D is independently selected from the group consisting of hydrogen, an alkyl radical of 1 to 10 carbon atoms, phenyl, and a radical that completes a ring structure including B or Y to form a heterocycle; B is a polyvalent radical selected from the group consisting of alkylene, aralkylene, cycloalkylene, phenylene, polyalkylene oxide, including for example, polyethylene oxide, polypropylene oxide, polytetramethylene oxide, and copolymers and mixtures thereof; m is a number that is 0 to about 1000; n is a number that is equal to or greater than 1; and p is a number that is about 5 or larger, preferably about 15 to 2000, more preferably about 30 to 1500.

In the use of polyisocyanates (Z is a radical having a functionality greater than 2) and polyamines (B is a radical having a functionality greater than 2), the structure of Formula I will be modified to reflect branching at the polymer backbone. In the use of endcapping agents, the structure of Formula II will be modified to reflect termination of the polydiorganosiloxane urea chain.

The silicone-containing process additives described herein may be present in the described compositions in a weight percent of from 0.01 wt % to 5.0 wt %, based on the total weight of the composition. More particularly, the silicone-containing process additive may be present in a weight percent of from 0.01 wt % to 0.5 wt % based on the total weight of the composition.

Methods of Making Polydiorganosiloxane Polyamide Copolymers

The linear block copolymers having repeat units of Formula I can be prepared, for example, as discussed in WO 2010/077480. Further, polydiorganosiloxane urea containing copolymers may be prepared, also as discussed in WO 2010/077480.

Synergist

In the present description, suitable synergists (sometimes also referred to in the field as "interfacial agents"), may be included into either a masterbatch or into extrudable compositions. By interfacial agent is meant a thermoplastic polymer which is characterized by (1) being in the liquid state (or molten) at the extrusion temperature; (2) having a lower melt viscosity than both the hydrocarbon polymer and the process additive; and (3) freely wets the surface of the process additive particles in the compositions.

Examples of such synergists include, but are not limited to i) a silicone-polyether copolymer; ii) an aliphatic polyester such as poly(butylene adipate), poly(lactic acid) and polycaprolactone polyesters (preferably, the polyester is not a block copolymer of a dicarboxylic acid with a poly(oxyalkylene) polymer); iii) aromatic polyesters such as phthalic acid diisobutyl ester; iv) polyether polyols such as poly(tetramethylene ether glycol); v) amine oxides such as octyidimethyl amine oxide; vi) carboxylic acids such as hydroxy-butanedioic acid; vii) fatty acid esters such as sorbitan monolaurate and triglycerides; and vii) poly(oxyalkylene) polymers. As used herein, the term "poly(oxyalkylene) polymers" refers to those polymers and their derivatives that are described in U.S. Pat. No. 4,855,360. Such polymers include polyethylene glycols and their derivatives.

One embodiment of aliphatic polyester synergist is a polycaprolactone having a number average molecular weight in the range of from 1000 to 32000, or more specifically from 2000 to 4000.

Another embodiment of synergist includes poly(oxyalkylene) polymers, such as poly(ethylene)glycol polymers having a number average molecular weight in the range of from 1000 to 12,000, or more specifically from 5000 to 10,000.

The synergist is a relatively low molecular weight ingredient which, for a particular system of process additive and hydrocarbon polymer, may improve the efficacy of the process additive. The synergist may be introduced at any point up to and including the final melt shaping process. In some instances, the process additive and synergist may be combined in a masterbatching step where both ingredients are present at high concentration (i.e., at greater than or equal to 1 wt. %, based on the total weight of the masterbatch).

In specific embodiments, the synergist may be present in an amount of from 10 wt % to 70 wt % based on the total amount of synergist and process additive, more specifically from 10 wt % to 50 wt %, and even more specifically, from 10 wt % to 30 wt %. As can be seen in the Examples, applicants have found that such amounts of synergist with the process additive can give superior results in melt-fracture elimination at one hour.

Other Additives

Functional components, tackifiers, plasticizers, and other property modifiers may be incorporated in the hydrocarbon polymer, the process additive, or both of the components of the presently disclosed compositions. Optional additives generally are not hot melt processable. That is, they do not melt and flow at the temperatures at which the hydrocarbon polymer and the process additive component melt and flow.

Functional components include, for example, antistatic additives, ultraviolet light absorbers (UVAs), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, fumed silica, glass beads, glass bubbles, glass fibers, mineral fibers, clay particles, organic fibers, e.g., nylon, KEVLAR, metal particles, and the like.

Functional components may also include, for instance, hindered amine light stabilizers. In a general sense, hindered amine light stabilizers are chemical compounds containing a functional group surrounded by a crowded steric environment. Generally, hindered amine light stabilizers are molecules that generally do not absorb UV radiation, but act to inhibit degradation of a polymer to which they are added. Generally, they act to slow down the photochemically initiated degradation reactions of the polymer, in some regards similar to the mechanism by which antioxidants function.

In some embodiments, the HALS described herein may be present in the compositions described herein in an amount of from 0.01 wt % to 3 wt %, based on the total weight of the composition. More specifically, the HALS described herein may be present in the compositions described herein in an amount of from 0.01 wt % to 1 wt %, based on the total weight of the composition.

In one embodiment, the hindered amine light stabilizers useful in the compositions of the present description are not particularly limited. In some embodiments, the hindered amine light stabilizers are selected from compounds having the general formula:

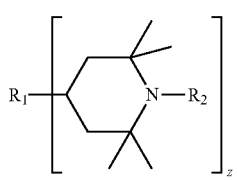

wherein R2 is selected from the group consisting of H and a C1 to C6 alkyl group, z is an integer of from 1 to 5, and R1 is an organic moiety having a valency of z. More particularly, R1 may be a C1 to C20 alkyl group, a C1 to C20 alkylene group (when z is greater than 1), a C6 to C20 aryl group, a C6 to C20 arylene group (when z is greater than 1) a C7 to C30 alkaryl group, a C7 to C30 alkarylene group (when z is greater than 1), a C7 to C30 alkaryl group, or a C7 to C30 alkarylene group (when z is greater than 1). Any of these R1 groups may be interrupted by one or more oxygen atom (e.g., in the form of an ether linkage), may contain one or more carbonyl groups (e.g., in the form of an ester, amide, ketone, etc.) and/or may contain one or more halogen atom.

Specific examples of HALS include tertiary hindered amines, and aromatic amines. Tertiary amines include those available under the tradenames Tinuvin 622 (from BASF Corporation). Aromatic amines include Chimasorb 944 (available from BASF Corporation). Other tertiary amines include, DABCO (1,2-diazo[2,2,2]bicyclooctane, from Lancaster Synthesis, Inc), 4-(dimethyl amino)benzaldehyde (available from Alfa Aesar), 2-ethylimidazole (available from Alfa Aesar), and 4-cyanopyridine (Aromatic, available from TCI America).

Such optional additives can be added in amounts up to 100 parts per 100 parts of the sum of the hydrocarbon polymer and the process additive, provided that if and when incorporated, such additives are not detrimental to the function and functionality of the final composition and/or articles derived therefrom. Other additives such as light diffusing materials, light absorptive materials and optical brighteners, flame retardants, stabilizers, antioxidants, compatibilizers, antimicrobial agents such as zinc oxide, electrical conductors, thermal conductors such as aluminum oxide, boron nitride, aluminum nitride, and nickel particles, including organic and/or inorganic particles, or any number or combination thereof, can be blended into these systems.

The functional components discussed herein may also be incorporated into the process additive provided such incorporation does not adversely affect any of the resulting products to an undesirable extent.

Processes of Making Compositions and Constructions

The presently disclosed compositions and constructions can be made by solvent-based processes known to the art, by a solventless process, or by a combination of the two.

One skilled in the art can expect the optimum mixture to be a function of the architecture and ratios of the process additive, the architecture and ratios of the hydrocarbon polymer, and whether any functional components, additives, or property modifiers are added.

Such processes, variations, and considerations are discussed, for example, in WO 2010/077480.

Various articles can be made using the disclosed compositions. These articles can be made by various methods, including, melt mixing the hydrocarbon polymer and the process additive to form a composition, and molding the composition (e.g., by blow molding, injection molding, and the like). Melt mixing can done by batch blending or extrusion.

These articles include blow molded films, injection molded tubes, bottles tube fittings, and the like. Articles made using the disclosed compositions have a weight percent of the processing additive ranging from 0.01 wt % to 10 wt % based on the total weight of the article.

Embodiments

The articles and compositions described in the present application are further represented by the following listing of embodiments.

Embodiment 1. A composition comprising:
from 50 to 99.99 weight percent based on the total weight of the composition of a melt-processable thermoplastic hydrocarbon polymer;
a silicone-containing polymeric process additive; and
a synergist;
wherein the synergist is present in an amount of from 10 wt % to 70 wt % based on the total amount of synergist and process additive.

Embodiment 2. The composition of embodiment 1, wherein the hydrocarbon polymer is selected from the group consisting of: a polyethylene homopolymer, a polypropylene homopolymer, a modified polyethylene polymer, a modified polypropylene polymer, a polyethylene copolymer, a polypropylene copolymer, and a combination thereof.

Embodiment 3. The composition of embodiment 1 or 2, wherein the hydrocarbon polymer is selected from the group consisting of a high density polymer and a low density polymer.

Embodiment 4. The composition of any of the preceding embodiments, wherein the hydrocarbon polymer is a linear low density polyethylene.

Embodiment 5. The composition of any of the preceding embodiments, wherein the silicone-containing polymeric process additive is a silicone-polyurethane.

Embodiment 6. The composition of any of embodiments 1 to 4, wherein the silicone-containing process additive is a silicone-polyamide selected from the group consisting of:
a copolymer comprising at least two repeat units of Formula I:

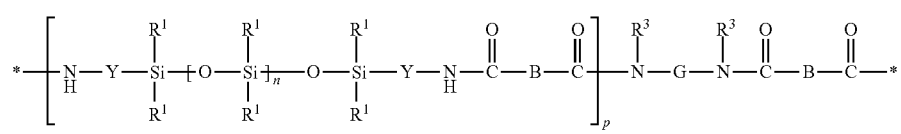

wherein each $R^1$ is independently selected from the group consisting of: an alkyl group, a haloalkyl group, an aralkyl group, an alkenyl group, an aryl group, an alkoxy group, and a halogen;

each Y is independently selected from the group consisting of: an alkylene group, aralkylene group, and a combination thereof;

G is a divalent group;

each B is independently selected from the group consisting of: a covalent bond, an alkylene group having from 4 to 20 carbons atoms, an aralkylene group, an arylene group, and a combination thereof; n is an integer of 0 to 1500; and p is an integer of 1 to 10; and each $R^3$ is independently selected from the group consisting of: an alkyl group, a haloalkyl group, an aralkyl group, an alkenyl group, an aryl group, an alkoxy group, and an alkylene group having 2 or more carbon atoms forming a heterocyclic ring that includes the $R^3$ groups, the nitrogen atoms, and G.

Embodiment 7. The composition of any of the preceding embodiments, wherein the silicone-containing process additive is present in a weight percent of from 0.01 wt % to 3.0 wt % based on the total weight of the composition.

Embodiment 8. The composition of any of the preceding embodiments, wherein the total weight of the process additive and the synergist is from 0.01 wt % to 5.0 wt % based on the total weight of the composition.

Embodiment 9. The composition of any of the preceding embodiments, wherein the hydrocarbon polymer is present in a weight percent of from 99.99 wt % to 95 wt % based on the total weight of the composition.

Embodiment 10. The composition of any of the preceding embodiments, wherein the synergist is selected from the group consisting of i) a silicone-polyether copolymer; ii) an aliphatic polyester; iii) an aromatic polyester; iv) a polyether polyol; v) an amine oxide; vi) a carboxylic acid; vii) a fatty acid ester; and vii) a poly(oxyalkylene) polymer.

Embodiment 11. The composition of any of the preceding embodiments, wherein the synergist is selected from (a) a polyethylene glycol; and (b) a polycaprolactone.

Embodiment 12. The composition of any of the preceding embodiments, wherein the synergist is a polyethylene glycol.

Embodiment 13. The composition of any of the preceding embodiments, wherein the synergist is present in an amount of from 10 wt % to 50 wt % based on the total amount of synergist and process additive.

Embodiment 14. The composition of any of the preceding embodiments, wherein the synergist is present in an amount of from 10 wt % to 30 wt % based on the total amount of synergist and process additive.

Embodiment 15. The composition of any of the preceding embodiments, further comprising a hindered amine light stabilizer selected from compounds having the general formula:

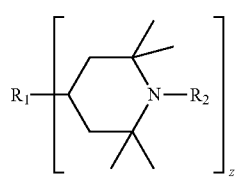

wherein R2 is selected from the group consisting of H and a C1 to C6 alkyl group, z is an integer of from 1 to 5, and R1 is an organic moiety having a valency of z.

EXAMPLES

The following examples are merely for illustrative purposes and are not meant to limit in any way the scope of the appended claims. All parts, percentages, ratios, and the like in the examples are by weight, unless noted otherwise.

Materials

| Acronym | Description |
|---|---|
| PA-1 | A polydimethyl silicone commercially available under the trade designation "DMS-T72" from Gelest, Inc., Morrisville, PA. |
| PA-2 | A silicone polyoxamide polymer with a 25,000 MW siloxane block preparable according to the method described in US2008 0318065 (Sherman et al.). |
| PA-3 | A silicone polyurea (SPU), containing over 90% siloxane and consisting of a 2 phase block copolymer made up of a soft polydimethylsiloxane (PDMS) phase and a hard aliphatic isocyanate phase, commercially available from Wacker Chemie, Munich, Germany under the trade designation "GENIOMER 140 SILICONE TPE" |
| T-1 | A linear low density polyethylene (LLDPE) commercially available from Exxon Mobil under the trade designation "EM 1002.09" |
| T-2 | A LLDPE commercially available from Chevron Philips Chemicals under the trade designation "MARFLEX 7109" |
| Zinc Stearate | A zinc stearate commercially available from Alfa Aesar, Ward Hill MA, under the stock # 33238 |
| Erucamide | Added to the test resin in the form of a 5% additive concentrate (# 10090) available from Ampacet Corporation, Tarrytown, NY |
| ABT-2500 | A talc antiblock commercially available from Specialty Minerals, Bethelem PA. It was added to the test resin in the form of a 60% concentrate (#101558) available from Ampacet Corporation, Tarrytown, NY |
| PEG | A polyethyleneglycol (PEG) commercially available from Dow Chemical, Midland, MI under the trade designation "PEG 8000" |
| PCL | A polycaprolactone (PCL) commercially available from the Dow Chemical company, Midland, MI, under the trade designation "TONE POLYOL 1270". |

Master Batch Preparation

Polymer processing additive (PPA) and synergist master batches (MB) were prepared using a laboratory scale, intermeshing, counter rotating, unvented, air cooled, conical twin screw (commercially available from HaakeBuchler under the trade designation "RHEOMIX TW-100") with a front inside diameter of 20 mm. The blend was gravity fed to the throat of the extruder, exposed to air at a rate of 38 g/min. The specific temperature profile of the 3 zone (feed, metering, mixing), plus die extruder was 170/190/200/200° C. respectively. The extruder was run at 150 RPM for the first "compounding" pass. The 2nd pass was run at the same temperature profile but at 90 RPM while flood feeding the material. A 4 minute "purge" of material was discarded at the beginning each pass.

2 or 3 kg batches were prepared by shaking vigorously in a bag the given amount of granular T-1 resin, 1000 ppm of ANTIOXIDANT and 700 ppm of zinc stearate. The additives to evaluate were prepared as separate MB's at a level of 3%.

As used throughout this section, "CE" indicates a comparative example and "EX" indicates an example according to the disclosure of the present application.

Melt Fracture Elimination Test—Synergist (Conditions A)

Examples were tested for melt fracture elimination using the T-2 host resin. Trials were conducted using a Kiefel blown film line (commercially available from Kiefel, Hampton, N.H.) with a 40 mm, 24/1, grooved feed extruder. The die was of spiral design with a 40-mm diameter and 0.6-mm or 0.9-mm die gap (25 or 36 mil). A first set of examples was prepared by testing in the host resin at 210° C. (410° F.), 0.9 mm (36 mil) gap, 14 L/D, 10.5 kg/h (23 lb/h), and 220/s, in combination with 7500 ppm of "ABT-2500" (Ampacet MB #101558) and 1500 ppm of Erucamide (Ampacet MB #10090).

Prior to each evaluation it was necessary to ensure that the blown film line was free of residual fluoropolymer from the previous evaluation. This was accomplished by extruding approximately 9 kg of purge resin, "POLYBATCH KC-15" (commercially available from A. Schulman, Akron, Ohio). The base resin was then extruded into film, under the original conditions for a minimum of one hour, until the previously determined extrusion pressure was achieved and the resultant film was fully melt-fractured.

Samples for extrusion were prepared by weighing the required amount of process additive concentrate, pelleted resin and other additive concentrates into a 5 gallon pail and mixing on a pail tumbler for a minimum of 10 min. The process additive concentrates used in the following examples were produced as described above using the Haake twin screw extruder.

The percent melt fracture was determined by taking a section of the film lay flat, opening it along the edge, measuring the individual bands (regions) of melt fracture in the transverse direction of the film, summing their total, and then dividing by the total width of the opened lay flat film.

For each sample tested, once the baseline for the host resin was established, the resin containing PPA (blend resin, host resin and additive concentrates) was charged to the extruder and the time was recorded. At 10 minute intervals a film sample was taken and inspected visually in terms of melt fracture elimination (% MF) until the film was free of MF or until the 80 min mark.

Data is reported in Table 1. The examples show the improvement in performance obtained by adding a synergist to PA-2 and PA-3

TABLE 1

| Example* | PA | PA level ppm | Synergist | Synergist level ppm | Percent Melt fracture at 80 min |
|---|---|---|---|---|---|
| CE1 | PA-2 | 1500 | None | 0 | 28 |
| CE2 | PA-2 | 750 | None | 0 | 98 |
| CE3 | PA-1 | 1500 | None | 0 | 100 |
| CE4 | PA-1 | 750 | PEG | 750 | 100 |
| CE5 | PA-3 | 1500 | None | 0 | 43 |
| CE6 | None | 0 | PEG | 1500 | 100 |
| EX1 | PA-2 | 750 | PEG | 750 | 0 |
| EX2 | PA-2 | 750 | PCL | 750 | 56 |
| EX3 | PA-3 | 750 | PEG | 750 | 2 |

*All examples in Table 1 used T-2 resin.

Melt Fracture Elimination Test—Synergist Ratios

Examples 4-10

Separate Master batches of PEG and PA-2 were prepared as described above, using polyethylene glycol as the synergist and holding the total amount (in ppm) of process additive and synergist constant at 1500 ppm. The MB were let down to final level at the blown film line for the Melt Fracture Elimination Test, under Conditions A, except that a recently Ni-plated die was used. The results are reported in Table 2.

TABLE 2

| | CE7 | EX4 | EX5 | EX6 | EX7 | EX8 | CE8 |
|---|---|---|---|---|---|---|---|
| PA-2 Level (ppm) | 1500 | 1350 | 1070 | 750 | 450 | 150 | 0 |
| Synergist level (ppm) | 0 | 150 | 430 | 750 | 1050 | 1350 | 1500 |
| Wt % Synergist (compared to total PPA + Synergist) | 0 | 10 | 29 | 50 | 70 | 90 | 100 |
| Time (min) | | | | | | | |
| 0 | 100 | 100 | 100 | 100 | 100 | 100 | 100 |
| 10 | 100 | 100 | 100 | 100 | 100 | 100 | 100 |
| 20 | 94 | 92 | 93 | 97 | 100 | 100 | 100 |
| 30 | 78 | 36 | 52 | 85 | 99 | 100 | 100 |
| 40 | 42 | 8 | 10 | 55 | 90 | 100 | 100 |
| 50 | 16 | 2 | 2 | 14 | 75 | 100 | 100 |
| 60 | 0 | 0 | 0.1 | 3 | 30 | 98 | 94 |

We Claim:

1. A composition comprising:

from 50 to 99.99 weight percent based on the total weight of the composition of a melt-processable thermoplastic hydrocarbon polymer;

a silicone-containing polymeric process additive effective to reduce melt fracture, wherein the silicone-containing polymeric process additive is selected from the group consisting of polydiorganosiloxane polyamide polymers and silicone-polyurethane polymers; and a synergist that improves the efficacy of the process additive to reduce melt fracture;

wherein the synergist is present in an amount of from 10 wt % to 50 wt % based on the total amount of synergist and process additive.

2. The composition of claim 1, wherein the hydrocarbon polymer is selected from the group consisting of: a polyethylene homopolymer, a polypropylene homopolymer, a modified polyethylene polymer, a modified polypropylene polymer, a polyethylene copolymer, a polypropylene copolymer, and a combination thereof.

3. The composition of claim 1, wherein the hydrocarbon polymer is selected from the group consisting of a high density polymer and a low density polymer.

4. The composition of claim 1, wherein the hydrocarbon polymer is a linear low density polyethylene.

5. The composition of claim 1, wherein the silicone-containing polymeric process additive is a silicone-polyurethane.

6. The composition of claim 1, wherein the silicone-containing process additive is a silicone-polyamide selected from the group consisting of:

a copolymer comprising at least two repeat units of Formula I:

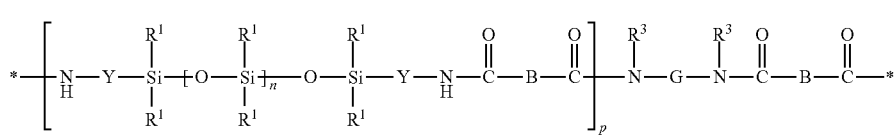

wherein each $R^1$ is independently selected from the group consisting of: an alkyl group, a haloalkyl group, an aralkyl group, an alkenyl group, an aryl group, an alkoxy group, and a halogen;

each Y is independently selected from the group consisting of: an alkylene group, aralkylene group, and a combination thereof;

G is a divalent group;

each B is independently selected from the group consisting of: a covalent bond, an alkylene group having from 4 to 20 carbons atoms, an aralkylene group, an arylene group, and a combination thereof; n is an integer of 0 to 1500; and p is an integer of 1 to 10; and each $R^3$ is independently selected from the group consisting of: an alkyl group, a haloalkyl group, an aralkyl group, an alkenyl group, an aryl group, an alkoxy group, and an alkylene group having 2 or more carbon atoms forming a heterocyclic ring that includes the $R^3$ groups, the nitrogen atoms, and G.

7. The composition of claim 1, wherein the silicone-containing process additive is present in a weight percent of from 0.01 wt % to 3.0 wt % based on the total weight of the composition.

8. The composition of claim 1, wherein the total weight of the process additive and the synergist is from 0.01 wt % to 5.0 wt % based on the total weight of the composition.

9. The composition of claim 1, wherein the hydrocarbon polymer is present in a weight percent of from 99.99 wt % to 95 wt % based on the total weight of the composition.

10. The composition of claim 1, wherein the synergist is selected from the group consisting of i) a silicone-polyether copolymer; ii) an aliphatic polyester; iii) an aromatic polyester; iv) a polyether polyol; v) an amine oxide; vi) a carboxylic acid; vii) a fatty acid ester; and vii) a poly(oxyalkylene) polymer.

11. The composition of claim 1, wherein the synergist is selected from (a) a polyethylene glycol; and (b) a polycaprolactone.

12. The composition of claim 1, wherein the synergist is a polyethylene glycol.

13. The composition of claim 1, wherein the synergist is present in an amount of from 10 wt % to 30 wt % based on the total amount of synergist and process additive.

14. The composition of claim 1, further comprising a hindered amine light stabilizer selected from compounds having the general formula:

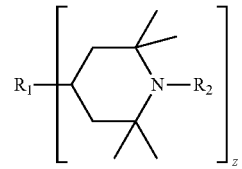

wherein R2 is selected from the group consisting of H and a C1 to C6 alkyl group, z is an integer of from 1 to 5, and R1 is an organic moiety having a valency of z.

* * * * *